Jan. 29, 1963  D. R. SPILKY  3,075,564
FOOD SLICING MACHINE
Filed May 29, 1961  2 Sheets-Sheet 1
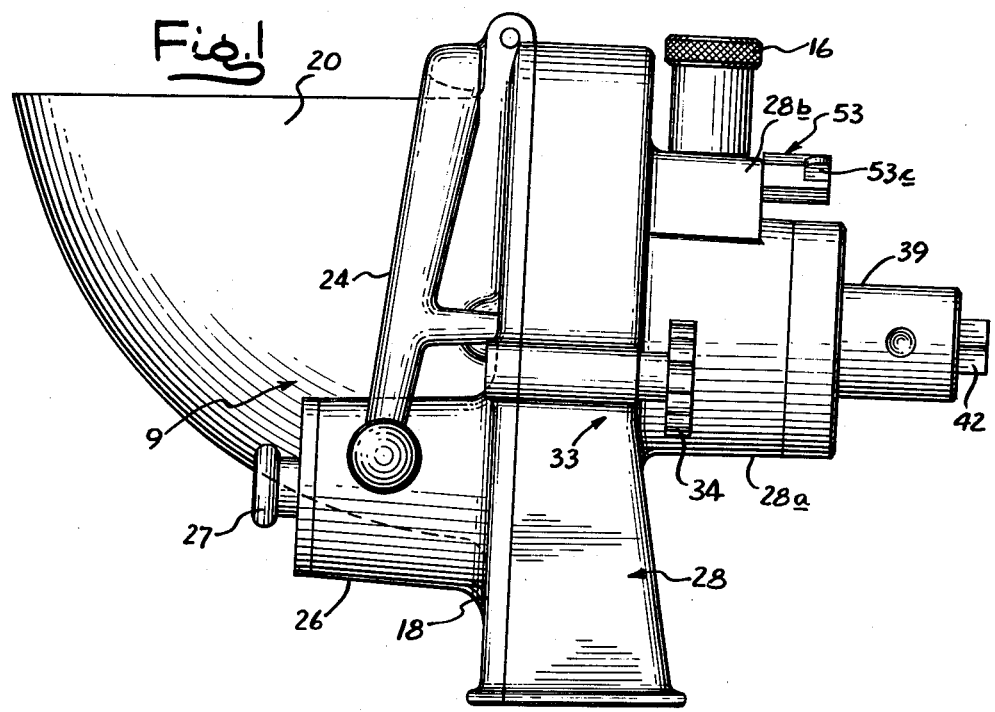
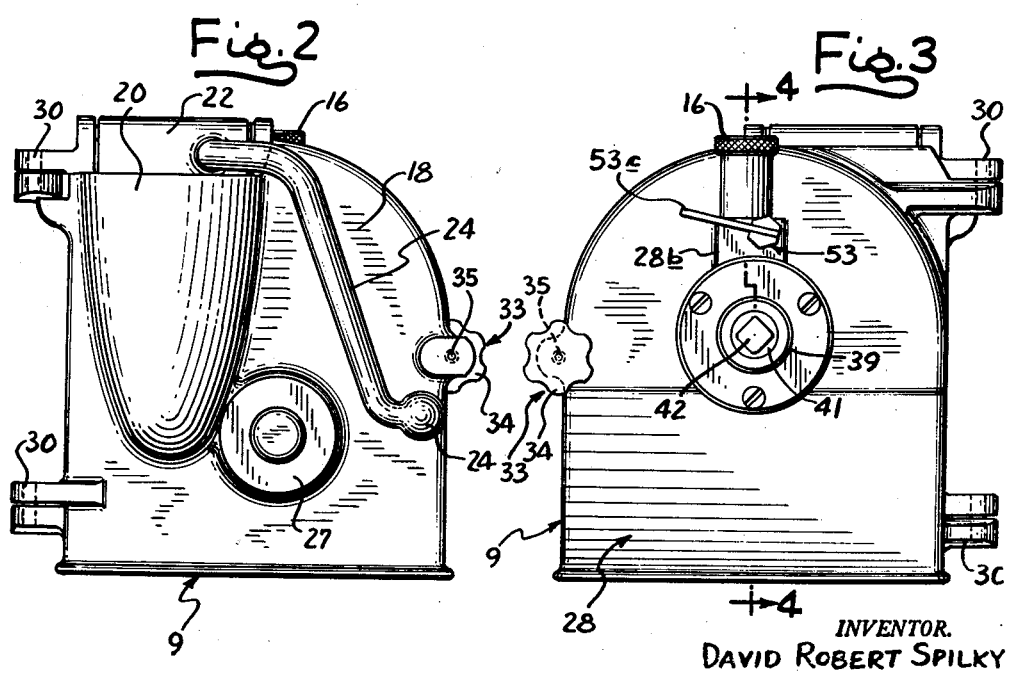
INVENTOR.
DAVID ROBERT SPILKY
BY
Irwin C. Alter
ATTY.

Jan. 29, 1963 D. R. SPILKY 3,075,564
FOOD SLICING MACHINE
Filed May 29, 1961 2 Sheets-Sheet 2
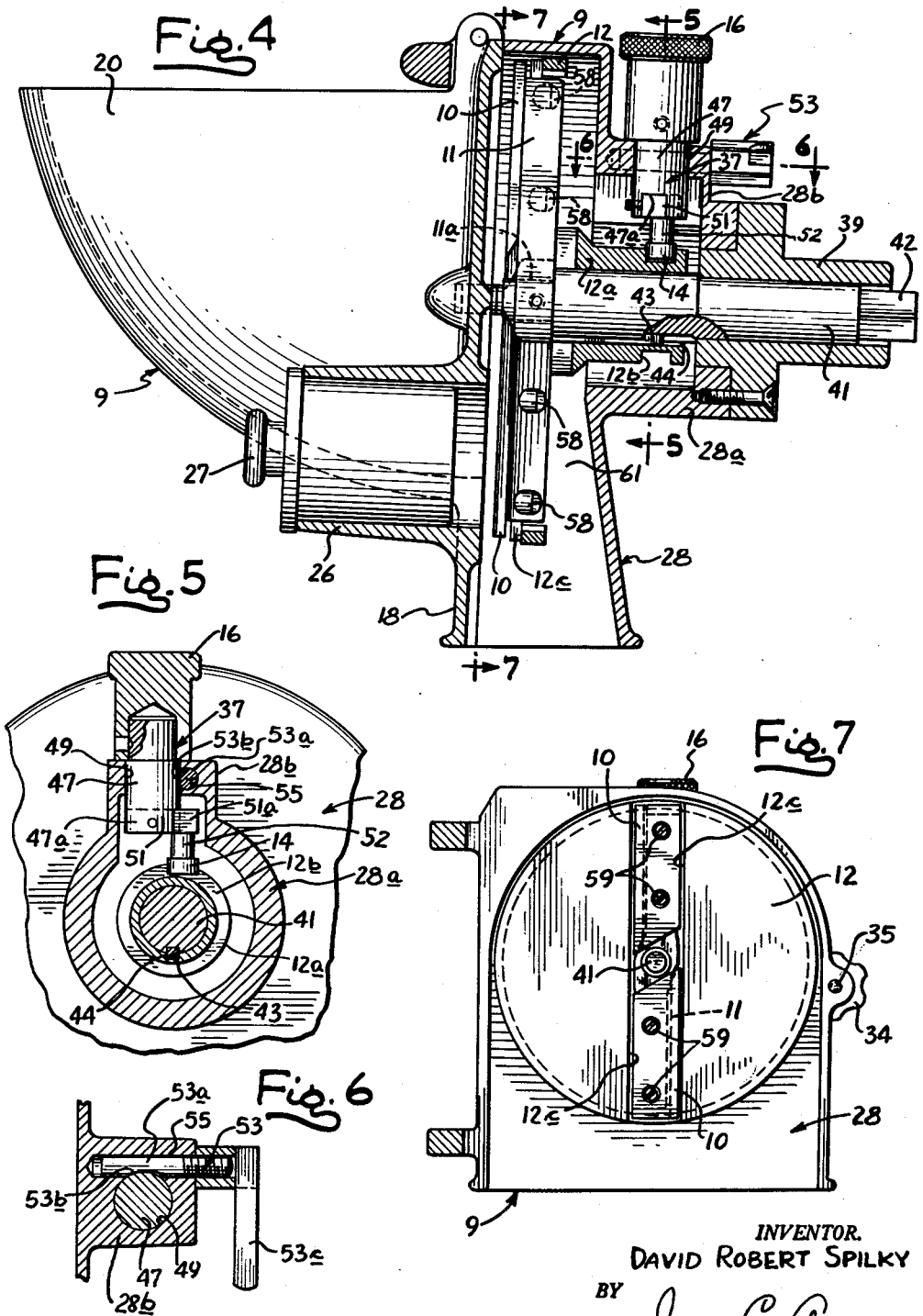
INVENTOR.
DAVID ROBERT SPILKY
BY
ATTY.

United States Patent Office 3,075,564
Patented Jan. 29, 1963

3,075,564
FOOD SLICING MACHINE
David Robert Spilky, 5326 W. Quincy St.,
Chicago 44, Ill.
Filed May 29, 1961, Ser. No. 113,381
4 Claims. (Cl. 146—115)

This invention relates to a slicing machine which can be used for cutting vegetables, meats or other foods. More particularly, it relates to a slicing machine which has a means for adjusting its slicing plate with relation to its blades in order that the thickness of the food that has been sliced can be readily controlled.

When a slicing machine is used with different types of foods and the thickness of the sliced food must be varied, it is desirable to have a machine that can be readily adjusted. Although the prior art discloses machines which can be adjusted to give sliced products which have different thicknesses, they are not entirely satisfactory, it being a primary object of this invention to correct the disadvantages of these adjustable slicing machines.

One of the disadvantages of prior art adjustable slicing machines was that the machine had to be taken apart in order to adjust it.

Another drawback of the prior art devices was that they could not be adjusted without stopping the operation of the machine.

Still another drawback resided in the fact that there was no way of quickly and positively "locking in" an adjustment setting once it was made.

My invention eliminates these disadvantages and others which were found in the prior art adjustable slicing machines by providing a slicing machine which has an adjusting means that is accessible from the outside of the slicing machine and has a cam which is associated with the slicing plate so that the plate can be adjusted with respect to a slicing blade, while the slicing machine is in operation. My invention further includes a cam lock which quickly and positively "locks in" an adjustment setting once it is made.

It is therefore an object of this invention to provide a new and improved adjustable slicing machine.

Another object of this invention is to provide an adjustable slicing machine which can be adjusted while it is in operation.

Still it is another object of this invention to provide an adjustable slicing machine which can be adjusted without disassembling it.

Still it is another object of this invention to provide a slicing machine which can be quickly and easily adjusted and whose adjustment setting can be quickly and easily "locked in."

Other objects and advantages will become readily apparent to one skilled in the art upon reading the following specifications and its appended claims wherein:

FIG. 1 is a side elevational view of my new and improved slicing machine.

FIG. 2 is a front elevational view of the slicing machine illustrated in FIG. 1.

FIG. 3 is a rear elevational view of the slicing machine illustrated in FIG. 1.

FIG. 4 is an enlarged sectional view of FIG. 3 taken on a plane passing through the line 4—4 and looking in the direction of the arrows.

FIG. 5 is a partial sectional view of FIG. 4 taken on a plane passing through the line 5—5 and looking in the direction of the arrows.

FIG. 6 is a partial sectional view of FIG. 4 taken on a plane passing through the line 6—6 looking in the direction of the arrows.

FIG. 7 is a sectional view of FIG. 4 taken on a plane passing through the line 7—7 and looking in the direction of the arrows.

Referring in general to the drawings, I have illustrated an adjustable slicing machine which has a slicing plate that is associated with an adjusting means so that the distance between the slicing blades and the slicing plate may be varied. It should however be understood that my invention should not be limited to an adjusting means and slicing plate used in combination with the particular type of blades shown. Rather, it is intended that the scope of my invention is to include any type of cutting instrument utilized with my adjusting means and slicing plate. Such instruments as shredders or the like will therefore be contemplated for use in my invention.

Referring more particularly to the drawings, I have illustrated a slicing machine 9 that comprises a slicing plate 12 which is adjustably mounted to a shaft for rotation and a pair of blades 10 which are fixedly mounted to said shaft for rotation. The slicing plate 12 has a hub portion 12a with a circular groove 12b which receives a disc shaped cam 14 of an adjusting means 37 therein that is linked to and actuated by a knurled knob 16, whereby the slicing plate 12 can be axially adjusted with respect to said blades.

The slicing machine 9 has a front frame portion 18, which has a hopper 20 extending therefrom to admit the food to be sliced in the machine. A pusher plate 22 is pivotally mounted on the front frame portion 18 for rotational movement in the hopper 20. As illustrated in FIGS. 1 and 2, a crank 24 extends from said pusher plate 22 so that when it is desired to feed food into the hopper, the pusher plate 22 is rotated by the crank 24 to allow the food to be put in the hopper and thereafter the pusher plate is pressed against the food by actuating the crank accordingly.

Although, for the sake of illustrating this invention, the hopper 20 may be disposed anywhere, the hopper 20 is disposed on one side of the slicing machine 9 in order that when the food comes out of the hopper, it comes in contact with only one rotating blade which is moving in a downward direction. By having the food fed to just one blade, the food can be cut easier and more efficiently.

A rear frame portion 28 is attached to the front frame portion 18 by such means as a pair of pin type hinges 30 at one end and any well-known locking means, such as the threaded locking assembly 33 which consists of a knurled locking knob 34 attached to a threaded stud 35 which is threaded through an aperture 35a in the rear frame portion and is received by an aperture 35b in the front frame portion.

The rear frame portion 28 is the part of the slicing machine 9 which supports and houses the adjustable slicing plate 12, slicing blades 10 and adjusting means 37. When the rear frame portion 28 is assembled with the front frame portion 18, as illustrated in FIGS. 1 and 4, a hollow chamber 61 is defined by the two portions. This hollow chamber primarily has the slicing plate 12 and blades 10 of the machine 9 positioned to rotate therein. Also, this chamber provides communication between the hopper 20 and the exhaust port 26 which extends from the front frame portion 28 to provide egress for the sliced food. Once the food is fed into the hopper 20 and forced into the hollow chamber 61 by the pusher plate 22, the feed is cut by the cutter blades 10, and then it is forced to egress from the exhaust port 26 by the uncut food which is being forced into the slicing machine by the pusher plate 22.

The rear frame portion has a cylindrical sleeve portion 28a extending therefrom at approximately the middle thereof. As seen in FIG. 4, a hub bearing 39 is attached to the end of the cylindrical sleeve portion 28a and journals a rotatably mounted shaft 41 which is fixedly associated with the slicing blades 10 at one end. The shaft 41 also has the adjustable slicing plate 12 mounted thereto for rotation. The shaft has a key portion 43 which is received by a locking slot portion 44 on the hub portion 12a of the slicing plate 12 so that when the shaft 41 is rotated, both the slicing plate 12 and slicing blades 10 are rotated the same amount. Also this slot and key relationship enables the slicing plate 12 to be axially movable with respect to the cutting blades 10 by the adjusting means 37 without disturbing the fixed relative angular position of the blades 10 to the slicing plate 12.

The adjusting means 37 consists of a knurled knob 16 which is attached to a slotted shaft 47, said shaft extending through a bore 49 in a boss 28b, the boss extending from the upper portion of said cylindrical sleeve portion 28a as clearly seen in FIGS. 4 and 5. An arm 51 is attached to the slotted end 47a of the shaft 47 perpendicular with respect to said shaft. The arm 51 has a dowel 52 attached perpendicularly with respect thereto. A disc shaped cam 14 is rotatively attached to the dowel 52 at its lower end.

As mentioned before, the disc shaped cam 14 is received by a circular groove 12b in the hub portion 12a of the slicing plate 12. Therefore, the cam 14 rides in the circular groove 12b while the slicing plate is rotating. This association enables the slicing plate to be adjusted while the machine is in operation. Therefore, it can clearly be seen that rotation of the knurled knob 16 causes the cam shaped disc member 14 to actuate the slicing plate 12 axially with respect to slicing blades 10. When a certain setting is found, a cam lock 53 "locks in" this setting. The cam lock 53 has a stud 53a that protrudes through a bore 55 in the side of boss 28b as seen in FIG. 6. The stud 53a has an arcuate groove 53b therein which makes contact with the side of the slotted shaft 47 and retains said shaft in a fixed position by the friction between the two members which results from threadedly engaging a cam lock lever 53c to the stud 53a.

The blades 10 of my slicing machine are removably attached to a crossbar 11 by removable fasteners such as the screws 59. The crossbar 11 has a bore 11a therein which has the end of the shaft 41 inserted therein and fixedly attached thereto. Recesses 58 are formed in the crossbar 11 to receive the screws 59.

The slicing plate 12 has a diametrical slot portion 12c therein which receives the crossbar 11 and slicing blades 10 or is adjacent with respect thereto. It always stays in alignment with the blades and rotates the same amount because the slicing plate has no relative rotational movement with respect to the blades or crossbar. The diametrical slot does, however, move axially with respect to the blades 10 and crossbar 11 to provide a different distance therebetween and thus enable the slicing machine to cut different sized slices of food.

It should, however, be realized that this invention should not be limited to a slicing plate which has a diametrical slot, or any slot for that matter. Nor do I intend this invention to be limited to a slicing machine which has a slicing plate that has no relative rotation with respect to the cutter blades. My invention could work equally well in a machine where the cutter blades have relative rotation with respect to the slicing plate.

In order that the slicing machine may be operationally connected with a motor or other driving means (not shown), the shaft has a polygonal end 42 extending outward with respect to the hub bearing 39. Also, the exhaust port 26 can have a plug 27 inserted therein when the slicing machine 9 is not in operation so that the hazard stemming from access to the sharp slicing blades 10 is obviated.

It will thus be seen that I have provided a new and improved adjustable slicing machine which may be quickly adjusted and have the adjustment setting positively "locked in" without the disadvantages that were present in adjustable slicers in the prior art. Although I have disclosed one embodiment of my invention, it should be understood that my invention is susceptible of some change and modification without departing from the principal spirit thereof and for this reason, I do not wish to be limiting myself to the precise arrangement and formation of the several parts herein shown but the scope of my invention should include that which is recited in the claims, which are to be interpreted broadly.

I claim:
1. A food slicing machine comprising: a front frame portion attached to a rear frame portion, means for guiding food into and away from the cutting device of said machine, a shaft mounted for rotation in said slicing machine, at least one cutting device fixedly associated with said shaft for rotation, a slicing plate having a hub portion with a circular groove therein, said hub portion extending from the center of said slicing plate and having a center bore therein for enabling it to be rotatably mounted on said shaft, said hub portion having a locking slot portion which receives a key portion extending from the shaft to prevent any relative rotative motion between said slicing plate and said cutting device, an adjusting mechanism associated with said slicing plate to adjust said plate axially with respect to said blades by varying the axial distance therebetween, said adjusting mechanism having a shaft vertically protruding through a bore in a boss extending from the upper portion of said sleeve, an arm rigidly attached perpendicularly with respect to said vertically protruding shaft, said arm having a cylindrical dowel extending downwardly and perpendicularly therefrom with a disc shaped cam member rotatively mounted thereon, said cam member being disposed to ride in said circular groove of said hub, a knob mounted to said vertically protruding shaft at its upper end and providing a shoulder to hold said adjusting mechanism in position by resting against said boss, a cam lock stud protruding through a bore in the side of said boss, said stud having an arcuate slot which rests against a portion of the periphery of said shaft, means for causing said stud to be forced against said shaft to lock it into a fixed position.

2. A slicing machine comprising: a front frame portion attached to a rear frame portion, a shaft mounted for rotation in a cylindrical sleeve of said rear frame portion, a pair of cutting blades rigidly associated perpendicularly with said shaft, a slicing plate having a diametrical slot therein, said slicing plate having a hub portion extending from its center, said hub portion having a bore therein to enable said slicing plate to be rotatively mounted to said shaft, said shaft having a key, said sleeve having a locking slot, said slicing plate having said shaft extending through said hub with said key portion being received by said slot portion of said slicer plate to prevent any relative rotative motion between said slicing plate and said blades, an adjusting mechanism associated with said slicing plate to adjust said plate axially with respect to said blade so that the axial distance may be varied therebetween, said adjusting mechanism having a slotted shaft vertically protruding through a bore in a boss extending from the upper portion of said sleeve, an arm fixedly attached to said slotted shaft at the slotted end thereof and perpendicular to said shaft, said arm having a cylindrical dowel extending perpendicularly therefrom with a cylindrical cam member rotatively mounted therewith, said cam member being disposed to ride in said circular groove of said cylindrical sleeve member, a knurled knob mounted to said shaft and providing a shoulder to hold said adjusting mechanism in position by resting against said upper boss, a cam lock stud protruding through a bore in the side of said boss, said stud having an arcuate slot which rests against the periphery of said slotted shaft, a cam lever threadedly engaging said cam lock stud and resting against the side of said boss, whereby pivoting said adjusting mechanism's knob can cause said slicing plate to move in different axial positions with respect to said blades, and once said slicing plate is adjusted to the position desired it may be "locked in" by turning the cam lever so that it exerts an axial force on said stud and provides friction between said stud and slotted shaft so that the shaft doesn't rotate and accordingly the plate is prevented from moving axially with respect to said blades.

3. A food slicing machine comprising: a front frame portion attached to a rear frame portion, means for guiding unsliced food into the machine to be cut and guiding the sliced food out of the machine, a shaft mounted for rotation in a cylindrical sleeve of said rear frame portion, a pair of cutting blades removably attached to a cutting bar, said cutting bar being fixedly attached perpendicularly to said shaft, a slicing plate having a diametrical slot therein, a hub portion with a circular groove, said hub portion extending from substantially the center of said slicing plate, said shaft having a key portion, said hub portion having a locking slot, said slicing plate having said shaft extending through said hub portion with said key portion being received by said locking slot of said slicer plate to prevent any relative rotative motion between sad slicing plate and said blades and cutting bar, an adjusting mechanism associated with said slicing plate to adjust said plate axially with respect to said blades by varying the axial distance therebetween, said adjusting mechanism having a slotted shaft vertically protruding through a bore in a boss extending from the upper portion of said sleeve, an arm rigidly attached perpendicular to said shaft at the lower slotted end thereof, said arm having a cylindrical dowel extending downwardly and perpendicularly therefrom with a cylindrical cam member rotatively mounted thereon, said cam member being disposed to ride in said circular groove of said hub, a knurled knob mounted to said shaft at its upper end and providing a shoulder to hold said adjusting mechanism in position by resting against said boss, a cam lock stud protruding through a bore in the side of said boss, said stud having an arcuate slot which rests against a portion of the periphery of said slotted shaft, a cam lever threadedly engaging said cam lock stud and resting against the side of said boss, whereby pivoting said adjusting mechanism's knob causes said slicing plate to move in a range of positions that include positions where said blades are received by said slicing plate slot to those where there is considerable distance between said slicing plate and said blades, and once said slicing plate is adjusted to the position desired it can be "locked in" by turning the cam lever so that it exerts an axial force on said stud and provides friction between said stud and slotted shaft to prevent the slotted shaft from rotating and accordingly preventing the plate from moving axially with respect to said slicing blades.

4. A food slicing machine comprising: a rotatively driven shaft, at least one cutting device fixedly attached thereto, means for guiding food to and away from said cutting device, a planar plate adjustably mounted on said shaft for rotation, said planar plate having fixed relative rotation with respect to the rotation of said blades, said planar plate having a hub portion with a circular groove extending therefrom at its center, said hub portion having a center bore therein for said shaft to protrude through, and an adjusting means having a rotatively mounted disc shaped cam disposed to ride in said hub portion's circular groove, an adjusting knob outside of said slicing machine, a shaft attached to said adjusting knob and said cam to associate said knob and cam for relative motion, whereby plate may be adjusted axially with respect to said blades by rotating said adjusting knob, and a locking means having an arcuate slot in contact with said shaft, said locking means retaining said shaft in a fixed position by having its arcuate slot forced against said shaft and preventing further rotation of said adjusting knob.

References Cited in the file of this patent
UNITED STATES PATENTS
2,807,302    Qualheim _____ Sept. 24, 1957